Figure 4:
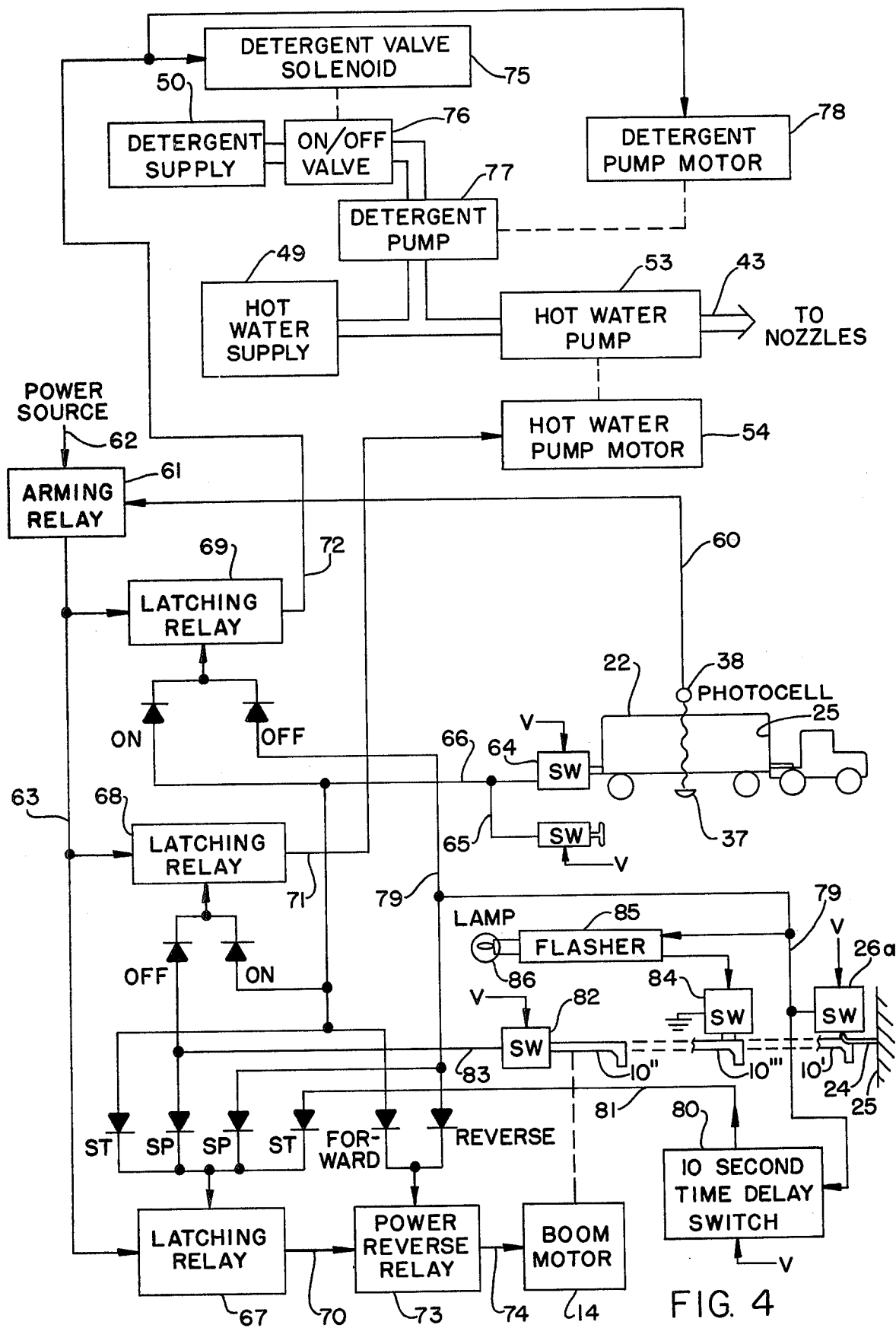

United States Patent [19]

Wiegand

[11] 4,106,516
[45] Aug. 15, 1978

[54] INTERNAL WASH CLEANER FOR TRUCK TRAILERS AND BODIES

[76] Inventor: Paul C. Wiegand, 4008 Harlanwood Dr., Fort Worth, Tex. 76109

[21] Appl. No.: 660,797

[22] Filed: Feb. 24, 1976

Related U.S. Application Data

[63] Continuation-in-part of Ser. No. 517,167, Oct. 23, 1974, abandoned.

[51] Int. Cl.² .............................. B08B 3/04; B60S 3/00; B08B 9/00
[52] U.S. Cl. ............................... 134/45; 134/167 R; 134/52; 134/57 R; 134/123; 239/165; 239/187
[58] Field of Search .......................... 134/45–47, 134/50, 8, 52, 57 R, 123, 166 R–168 R, 171; 239/165, 178, 186–187, 239, 281, 251; 118/3, 306

[56] References Cited

U.S. PATENT DOCUMENTS

| | | | |
|---|---|---|---|
| 1,835,132 | 12/1931 | Anania | 239/165 |
| 2,510,636 | 6/1950 | Johnson | 212/55 |
| 3,534,746 | 10/1970 | Posner | 134/46 |
| 3,689,318 | 9/1972 | Phillips | 134/45 X |
| 3,830,430 | 8/1974 | Hartunian | 239/186 |
| 3,897,263 | 7/1975 | Davis | 134/45 |
| 3,961,983 | 6/1976 | Crandall | 134/45 |

*Primary Examiner*—Harvey C. Hornsby
*Assistant Examiner*—Robert Pous
*Attorney, Agent, or Firm*—Warren H. Kintzinger

[57] ABSTRACT

A truck trailer interior washing system with a washing head mounted on an extendable and retractable boom horizontally mounted for automated washing cycle extension into and back out of the trailer interior. A truck body or trailer is backed into exact position, centered and aligned with the boom, with the use of guide rails and a centering plate structure automatically moving trailer wheels laterally in a centering action as required. When the system is activated, a pump is started to deliver hot detergent solution to the nozzled cleaning head from wash fluid back-up tanks and heaters as the extension boom is moved into the trailer at a predetermined rate (50' per minute, for example). A feeler bar and microswitch system senses when the inside nose of the trailer is reached and acts to stop the boom in the extended position for a short interval of time during which the pump and feed mechanism clears itself of detergent solution with microswitch activated clear hot water flush to the nozzles. Then the retraction system is activated for slow withdrawal of the washing head from the trailer with the hot water rinse continuing during withdrawal. A disinfectant cycle is also provided with the boom and wash head in an additional extension and retraction cycle with disinfectant solution being pumped to the wash head.

12 Claims, 4 Drawing Figures

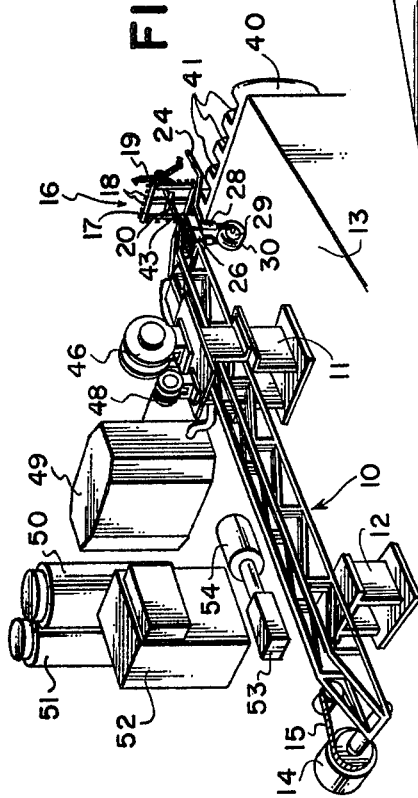

INTERNAL WASH CLEANER FOR TRUCK TRAILERS AND BODIES

This Application is a Continuation-in-Part of co-pending application, Ser. No. 517,167, filed Oct. 23, 1974, and now abandoned.

This invention relates in general to truck body and trailer interior washing systems, and in particular to a truck trailer interior washing system with washing head structure mounted on the fore end of an extendable and retractable horizontally mounted boom that is advanced and retracted at a moderate rate into and out of a trailer, open from the rear, through the various phases of a wash and rinse cycle.

Many pre-existing truck trailer interior washing systems, using carts that travel forward and back, and fixed-position spray-wash systems, have had various limitations and disadvantages. Some have a tendency to position-jam within a trailer and/or will not traverse the entire length and breadth of a trailer interior—and some depend on the driver of a truck to back the truck and then drive it forward at a closely controlled speed that is a problem to hold for many drivers. Movable equipment involving self-propelled carts that travel back and forth in a trailer body have proven to be complicated and time consuming in set up, expensive to build and to maintain, and require an operator attendant.

It is therefore a principal object of this invention to provide an improved truck trailer interior washing system giving excellent, complete, internal washing results in open-to-the-rear truck trailers and bodies.

Another object is to attain such improved truck trailer washing results in a uniform, predictably controlled cleaning cycle.

A further object is to attain such improved trailer interior washing results, uniformly, from trailer to trailer to truck body with minimal human intervention and control.

Features of this invention useful in accomplishing the above objects include, in an internal wash cleaner for truck trailers and bodies, an extendable and retractable horizontally mounted boom having a washing head assembly mounted on the fore end of the boom for automated washing cycle extension into and back out of trailer interiors.

Guide rails and a centering plate structure automatically and bodily moving trailer wheels laterally in a centering action are employed as an aid in getting truck bodies and trailers backed into exact centered position abutting a dock bumper. With a unit properly in position, the system is equipped for activation with a pump being started to deliver hot detergent solution through an extendable and retractable hose and pipe assembly, from wash fluid back-up tanks and heaters, to spray nozzles on the cleaning head, as the extension boom is drive-activated to move the washing head assembly into a trailer at a predetermined, controlled rate. The boom extension and retraction drive system is set to drive the boom at an optimized rate, both in and out, for thorough cleaning, with head end movement of approximately fifty feet per minute, for example. A feeler bar and microswitch system capable of sensing some obstructions within a truck trailer that must be removed for proper cleaning, also senses when the inside nose of the trailer is reached, and acts to stop the boom in the extended position, for a short interval of time. This controlled interval of time permits the pump and feed mechanism to clear itself of detergent solution, with microswitch-controlled boom stop and actuation of clear, hot water flush to the nozzles. The control system then activates the boom drive for boom retraction for slow withdrawal of the washing head from the trailer, with the hot water rinse continuing during withdrawal. Tankage, valving, piping, and control, is also provided for a disinfectant solution spray cycle, with the boom and wash head again being cycled through extension and retraction while disinfectant solution is being pumped and sprayed from the wash head.

A specific embodiment representing what is presently regarded as the best mode of carrying out the invention is illustrated in the accompanying drawing.

In the drawing:

FIG. 1 represents a perspective view of a truck trailer, with a side partly broken away, and a trailer interior washer mounted on a dock with an extendable-retractable boom having a washer-head-equipped front end, extended to the interior front end of the trailer, positioned for interior washing;

FIG. 2, the truck trailer internal washer of FIG. 1, with the extendable boom in the fully retracted state;

FIG. 3, an alternate washer head structure with a plurality of forward advance limit feelers; and, FIG. 4, a functional electromechanical diagram of a control system effecting automatic wash-rinse cyclic operation.

Referring to the drawing:

The extendable and retractable telescoping boom structure 10 of FIGS. 1 and 2, shown in the extended state in FIG. 1 and in the fully retracted state in FIG. 2, is mounted in a horizontal position on front and rear mounting columns 11 and 12, supported on a dock 13. The extendable boom structure 10 is a fabricated steel structure that is extended and retracted through use of properly incorporated cable and drum winch drive, including motor 14 and drive chain 15, in a conventional, extendable boom drive (not completely shown) such as used with extension ladders and the like. The motor 14 and drive chain 15 are arranged in the drum winch boom drive structure to extend and retract the boom mechanism at a rate of approximately 50 feet per minute. A wash head structure 16, having a non-rotating rectangular pipe frame 17 with multi-directionally oriented nozzles 18 mounted thereon, is mounted on the front fore end of extendable boom structure 10. The wash head structure 16 also includes a rotating spray head assembly 19, driven in rotation around a feed pipe 20 center rotation hub 21 by spray jet reaction, and mounted to the front of the rectangular pipe frame 17. Since the structure is an internal washing system for a truck body or trailer such as the trailer 22 of truck 23, shown, a feeler bar 24 is also mounted on the boom structure 10 to project forward from the front end of the boom, under the spray head structure 16, to contact the inside front 25 of the trailer 22, and via a microswitch mechanism 26 of a control circuit (to be further described) stop forward extension of the boom and initiate other operational sequences of a detergent wash and rinse cycle and a disinfectant treat cycle. A second microswitch, activated by the boom itself, may be so positioned that unless the entry of boom has entered a certain number of feet into a trailer being internally washed, a flashing light will appear to indicate that an obstruction has been sensed and needs to be cleared away before the trailer can be properly washed.

A wheel 27 and wheel mount structure 28 is suspended beneath the wash head 16 end of boom structure 10 to roll on the floor 29 of trailers 22 and lend vertical support to the forward end of the boom; particularly when the boom is in the extended state. A low-pressure, inflated tire 30 is mounted on wheel 27 to accommodate to reasonable height variations of a trailer floor 12. However, a bottom sensing bar 24 is set to sense-encounter the bed end of a truck trailer 22, if it is too high above the boom mounting dock 13 for proper entry and use of the boom 10 and wash head 16, in a normal wash cycle.

As a truck trailer 22 is backed into position for internal washing, with any lateral misalignment, rear tandem axle wheels 31 come into engagement with the divergently formed out ends 32 of opposite side guide rails 33, mounted on the wash ramp floor 34. At the same time, the wheels 31 are supported on rollers 35 of centering plate structures 36, to permit bodily movement of the trailer wheels 31, laterally, and thereby the trailer 22, in a centering action, as the trailer is being backed into position for an internal trailer wash. The trailer 22 is backed further, interrupting electric eye beams from trailer sensors 37 and 38 that are accompanied by a control post 39. Other eye beam equipment is provided on the other side of the trailer (detail not shown), and a final position indicator is provided for the truck driver (detail not shown). The final position indicator is actuated when the truck trailer 22 rear end is backed into engagement with dock bumper 40 that is provided with vertical slot serrations 41 along its transverse length, for ease of wash fluid flow from the rear of the trailer floor 29. The wash ramp floor 34 is slanted, to some moderate degree from front to rear, to facilitate flow of wash fluids to the rear of the truck trailer 22 and out, down through the serrations 41 of dock bumper 40 to floor drain 42.

The wash head structure 16 is mounted via a longitudinally-extended fluid feed pipe 43 extending from within the foremost section 10A of the extendable boom 10, to the front therefrom. Pipe 43, at its rear, has a connection 44 to hose 45 that extends back through the open-top boom, to take-up hose reel 46 that is provided with take-up torque means (detail not shown) of a conventional nature, to reel up hose as the boom is retracted and to let out hose as the boom is extended. In like manner, control cabling 47 extends from cable take-up reel 48, that is also equipped with take-up torque means (detail not shown) of a conventional nature, to reel up control cable as the boom is retracted, and to let out control cable as the boom is extended.

Fluid storage tanks 49, 50, and 51, fluid heating equipment 52, and fluid pump 53 and motor 54 are provided, linked with appropriate control system interconnects and equipment, to enable the wash and disinfect cycle stages required for washing trailer interiors. This back-up equipment is the same for the embodiment variation of FIG. 3, with a plurality of feeler probes 55 (six are shown) — in place of the single sensing probe 24 of FIGS. 1 and 2 — in order to more assuredly sense any obstruction that might be present in a trailer 22. Each of the feeler probes 55, that are pivotally mounted for resilient deflection, are connected through cable sense position shift sheathed cables 56 extended to a microswitch structure 26', that, when activated, through control system connection immediately stops forward motion of the trailer internal cleaner boom. Once stopped, the boom remains in a rest position for a period of seconds, and then automatically retracts from the trailer. Again, in order to provide an indication to the vehicle operator or the internal cleaner operator that an obstruction exists, a second microswitch, activated by the boom itself, is mounted in such position that unless there is entry penetration into the trailer by a certain number of feet, a flashing red light appears to indicate that an obstruction has been sensed that needs to be cleared away before the trailer can be properly washed.

When a trailer is backed into position, the internal washing equipment is activated, either automatically by sensing structure that is positioned in the area of the dock bumper, or by a push-button control. After the cycle is started, either by hand or by automatic sensor, the cycle is the same — other than with selective extension to detergent cycle, in addition to the basic wash cycle. The automatic sensing structure may be a light beam control device, activated by trailer intervention or may be an electro-mechanical switch, actuated by trailer-end-contact therewith, and with the dock bumper. Typical rates of boom extension and retraction are fifty feet per minute, with wash and rinse fluid being pumped by a fifty horsepower motor pump having a pumping capacity of one-hundred twenty-five gallons per minute at 300 p.s.i., for proper delivery from the cleaning head nozzles. With wash spray, during insertion-advance of washhead and boom within a trailer 22, the limit-feel sensor and control, upon contact with the inside nose of the trailer, stops boom advance and may light a red indicator light visible to the driver of the truck. The red light remains on for approximately the 10 seconds required for purging detergent fluid from the pump delivery and wash system, as initiated by the sensor control, simultaneously, with red light turn-on. This is with turn off of the detergent injection pump that has been feeding concentrated detergent into the hot water on the inbound side of the hot water pump that continues to pump water through the system. After the 10-second detergent purge interval, the red warning light may be turned off, and a green light may appear with activation of the boom and washhead retraction rinse stage of a wash cycle, with the washhead being withdrawn at approximately 50 feet per minute. When the extension boom is fully retracted to its rest position, the pumping system is automatically shut off, and a signal caused to appear by the control system, indicates to the truck driver that the wash cycle has been completed. Then as the truck and trailer are driven away from the dock, the electric control system remakes, resetting the washer system control for the next truck trailer or body.

The disinfectant cycle is in addition to the basic wash cycle and might be selectively implemented after a wash and rinse cycle, by selective manual activation of a disinfectant control initiate button. This causes the boom to recycle into and back out of the trailer, as the trailer is being internally sprayed with a warm water solution containing disinfectant. Here again, a signal light might appear after the disinfectant cycle is completed, indicating that both the wash and disinfect cycle sequence are completed, and that the truck should be pulled away from the dock. The back-up equipment tanks are equipped with stirring devices that stir detergent and disinfectant, respectively, into solution as they are being added; and, also through cyclic timing control, the stirring devices operate for a short time every five minutes or so, to insure that added material stays in proper mix within the tanks. Back-up equipment also includes, typically, four gas-fired water heaters, each having a capacity of 75 gallons, with a 360,000 BTU per hour input rate capacity and a total recovery rate of 1,200 gallons per hour through a 100° Fahrenheit rise.

Referring to FIG. 4, the system is armed for an automatic wash-rinse cycle, by a truck trailer body 22 interrupting a photoelectric beam sensor comprised of light source 37 and photoelectric switch 38, to cause a control voltage on line 60 to activate arming relay 61 to connect a power source 62 to power bus 63. Once trailer 22 is backed into washing position at the dock, the operation cycle may be initiated by one of two illustrated alternatives: The cycle may be automatically started by trailer impact with a switching means 64, or a further photoelectric sensor activated switch (not shown); or, alternatively, the cycle may be manually started by operator-depression of a start switch 65. Any one of the switching alternatives provides a control voltage V on line 66, which activates each of latching relays 67, 68, and 69, to connect the armed power bus 63 to the respective relay output power lines 70, 71, and 72.

Power on line 70 is applied to a power-reverse relay 73 (activated to "forward" position by the start control voltage on line 66), which supplies power 74 to boom drive motor 14, in a direction effecting extension of boom 10 within the truck body confines.

Power on line 71 is applied to hot water pump motor 54 that drives hot water pump 53.

Power on line 72 is applied to detergent valve solenoid 75, to turn on detergent supply valve 76, supplying detergent to detergent pump 77 from supply 50. Simultaneously, power on line 72 energizes detergent pump motor 78, thereby injecting detergent into the hot water supply line to hot water pump 53.

Thus, as boom 10 is extended into the trailer, the output line 43, from the hot water pump, supplies a mixture of detergent and hot water to wash nozzles. Boom 10 is extended by boom motor 14 drive until probe 24, on the forward extreme of the boom, impacts with the inner end wall 25 of trailer 22 (or any intervening obstacle), whereupon a probe, impact-activated microswitch 26a is operated to apply a control voltage impulse on control line 79. The control voltage on line 79 activates each of latching recycles 67 and 69, back to "off" position, thus deenergizing boom drive motor 14, and de-energizing detergent pump motor 78, respectively, while activating detergent valve solenoid 75 to turn off detergent supply valve 76. The control voltage on line 79 additionally activates boom power reverse relay 73, to "reverse" position, and activates a 10-sec time delay switch 80. Until the time delay is realized, the boom remains stationary at the point defined by probe contact while the fluid supply to the nozzles via supply line 43 is purged of detergent. When delay switch 80 operates, a control voltage appears on delay switch output line 81, to activate boom motor power latching relay 67 back to "on" position, thereby energizing boom drive motor, in a reversed direction, to effect retraction of boom 10 while the spray nozzles are delivering a hot water rinse.

Upon boom 10 being fully retracted to position 10″, a further switch 82 is activated to apply a control voltage on line 83, which activates each of latching relays 67 and 68 back to "off" position, thus turning off boom motor 14 and hot water pump motor 54.

Since the control cycle of automatic wash and rinse is the same whether the boom probe 24 impacts with trailer end wall 25, or with an intervening obstacle, as it is being extended, a further boom-carried switch 84, activated to close upon a predetermined boom extension to position 10‴, may be incorporated to warn the operator that the boom did not extend far enough in the cycle to effect a proper wash; that is, that an obstruction was sensed and should be cleared away before a proper wash can be effected. FIG. 4 shows switch 84, activated by pre-determined boom extension to position 10‴, to energize a flasher unit 85, by providing a ground return for control voltage on line 79 if probe impact is realized before boom 10 extends to predetermined position 10‴, thus enegizing a warning lamp 86. If boom 10 extends beyond position 10‴, before switch 84 is operated to remove ground, the control voltage on line 78, from probe-impact-operated switch 26a is not effective to energize the flasher unit 85.

The system is readied for a repeat automatic cycle when the truck body is driven clear of the arming photosensors, to shut off power to the power bus 63.

Whereas this invention is here illustrated and described with respect to a specific embodiment thereof, it should be realized that various changes may be made without departing from the essential contributions to the art made by the teachings hereof.

I claim:

1. In an internal washing system for truck cargo carrier enclosures open to the rear: multi-section extendable and retractable boom means; boom structure mounting means; fluid spray washing head means mounted on fore extendable end structure of said boom means; drive means of said boom means driving said boom fore extendable end and the washing head means in extension into the interior, and in retraction back out of said truck enclosure; fluid delivery system means interconnecting fluid source means and spray outlet means of said fluid spray washing head means; and washing cycle control means with selective fluid delivery control means operating said fluid source means and said fluid delivery system means in distinct cyclic operation sequential steps; said washing cycle control means comprising first switching means selectively operable to energize said drive means to effect boom extension into said cargo carrier enclosure and in circuit with said fluid delivery system control means to effect delivery of a mixture of detergent and water to said washing head means, second switching means responsive to a predetermined boom extension into said cargo carrier enclosure to effect de-energization of said drive means and in circuit with said fluid delivery system to effect a shut-off of detergent supply to said fluid mixture, time delayed switching means responsive to activation of said second switching means, and in circuit with said drive means, to energize said drive means in a reverse direction to effect retraction of said boom, and said further switching means responsive to full retraction of said boom and in circuit with said fluid delivery system, to de-energize said drive means and shut off said fluid delivery, thereby completing a washing cycle.

2. The truck enclosure internal washing system of claim 1, wherein said fluid delivery system means includes flexible hose and hose take-up reel means in interconnecting said fluid source means and said washing head means.

3. The truck enclosure internal washing system of claim 2, with said second switching means comprising contact probe sensing means, as a part of said washing cycle control means, mounted on the fore extendable end structure of said boom and having extension means extending further forward from the fore end of said boom than forward extension of said fluid spray washing head means.

4. The truck enclosure internal washing system of claim 3, with said contact probe sensing means having a single probe extension activating microswitch means.

5. The truck enclosure internal washing system of claim 3, with said contact probe sensing means having a plurality of probe extensions, each connected to activate microswitch means.

6. The truck enclosure internal washing system of claim 3, with said washing cycle control means including control wire cable means and wire cable take-up reel means in interconnecting said contact probe sensing means and switching means located on non-movable mount means of the internal wash system.

7. The truck enclosure internal washing system of claim 6, with said boom means mounted on a dock for substantially horizontal extension advance into and retraction from said truck cargo carrier enclosures.

8. The truck enclosure internal washing system of claim 7, with said drive means driving said boom means in extension advance and retraction return at substantially the same speed.

9. The truck enclosure internal washing system of claim 7, with a substantially rectangular spray head mounting pipe structure in said washing head means.

10. The truck enclosure internal washing system of claim 9, also including a rotating spray head assembly driven in rotation around rotatable mounting means with a feed pipe in said washing head means.

11. The truck enclosure internal washing system of claim 7, with truck cargo carrier enclosure positioning means mounted on a wash station floor, including truck rear wheel centering means positioned to act as a truck is backed toward the washing station dock.

12. The truck enclosure internal washing system of claim 11, with said first switching means comprising sensing means positioned to be operable upon a truck enclosure being in position at said washing station dock.

* * * * *